Feb. 9, 1971 M. W. SEWALL 3,561,966
DIFFUSION TRANSFER COMPOSITE FILM CONTAINING SILICA GEL
Original Filed March 9, 1964
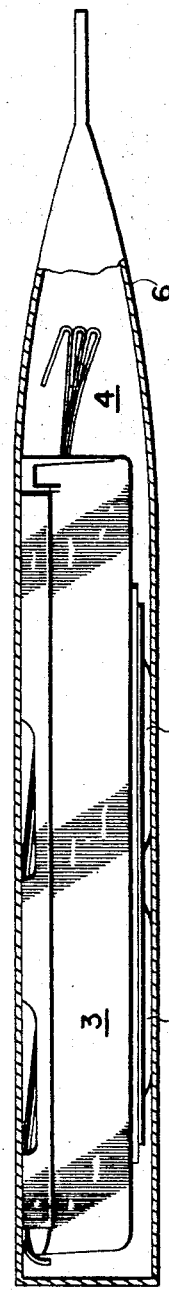
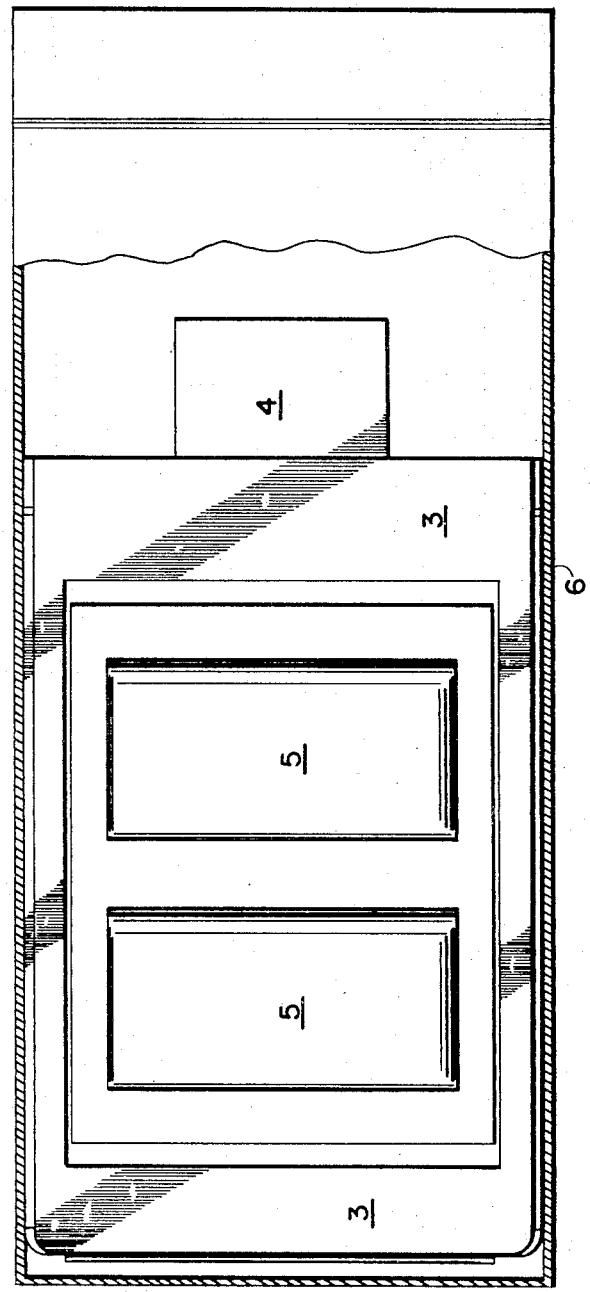
INVENTOR.
Mark W. Sewall
BY
Brown and Mikulka
ATTORNEYS United States Patent Office 3,561,966
Patented Feb. 9, 1971

3,561,966
DIFFUSION TRANSFER COMPOSITE FILM
CONTAINING SILICA GEL
Mark W. Sewall, Winchester, Mass., assignor to Polaroid
Corporation, Cambridge, Mass., a corporation of
Delaware
Continuation of application Ser. No. 350,449, Mar. 9,
1964. This application Feb. 7, 1969, Ser. No. 800,031
Int. Cl. G03c 1/40
U.S. Cl. 96—77                                           1 Claim

ABSTRACT OF THE DISCLOSURE

The shelf life of diffusion transfer films packaged in hermetically sealed containers is extended by including a desiccant, preferably silica gel, within the hermetically sealed container. Diffusion transfer film thus packaged exhibits reduced incidence of reagent stick, contamination and certain other problems.

This application is a continuation of my copending application, Ser. No. 350,449 filed Mar. 9, 1964, now abandoned.

This invention relates to photography and more particularly to novel photographic film assemblages and novel photographic products including such assemblages. In one aspect, this invention relates to novel and improved film packages.

U.S. Pat. 2,609,296, issued Sept. 2, 1950, to Edwin H. Land, describes a composite film pack comprising a photosensitive layer, a removable, light-impervious envelope for said photosensitive layer having attached thereto a receiving layer, said receiving layer being in face-to-face relationship with said photosensitive layer, and means releasably containing and adapted to release, upon application of compressive pressure thereto, a liquid photographic reagent providing a developing agent for said photosensitive layer, which reagent is further adapted to provide a transfer image in or on said receiving layer. Such a composite film is intended for use with certain cameras adapted to use a film pack or holder for separate frames of cut film. An example of such a camera is a 4 x 5 "press camera," such as the "Speed Graphic" camera, manufactured by the Graflex Company of Rochester, N.Y. Adaptors for use with such cameras which render them suitable for use with the composite film packs described above are known, e.g., as shown in U.S. Pat. No. 2,933,993, issued Apr. 26, 1960 to A. J. Bachelder et al., which patent also describes film pack structures suitable for use in said adaptors.

The photographic use of such composite film packs involves the placement of the entire film pack in a camera; the withdrawal of the light-impervious envelope and attached receiving layer from the photosensitive layer and from the camera, thus placing the photosensitive layer in readiness for a photographic exposure; the photographic exposure of said photosensitive surface to actinic radiation; the replacement in said camera and around the exposed photosensitive surface of said light-impervious envelope and attached receiving layer; and the controlled progressive application of mechanical stress to the composite structure to effect the release and spreading of the liquid photographic reagent between the photographically exposed photosensitive layer and the receiving layer. Thereafter, the receiving layer is stripped from the photosensitive layer to view the final photographic print.

Under conditions of general commercial employment, composite photographic film elements such as that described above are packaged for storage and distribution in hermetically sealed packages. The packaging generally employs a laminated foil, including a metallic layer and an internally positioned plastic or polymeric layer adapted to be heat sealed. Typically, such packaging is carried out at about 72° F. and at about 45% relative humidity, these conditions having been found to be practical for the moisture- and temperature-sensitive emulsions used in the photosensitive layers and requiring a minimum of special equipment to control environmental conditions in the packaging area. The packaged film elements are customarily stored for a period of months prior to their actual use, and, from time to time, at the end of such periods, problems of blocking or adhesion between the photosensitive surface and the receiving layer surface are encountered. While blocking is most pronounced in composite film pack elements such as those described above owing to the face-to-face relationship between the receiving layer and the photosensitive layer, similar problems sometimes arise whenever photographic film elements which comprise a support or film base having one or more gelatin layers coated on one or both sides of the support are stacked, for example, gelatin layer contacting gelatin or other polymeric layer, e.g., in film packs such as those described in U.S. Pat. 3,002,437, issued Oct. 3, 1961, or when a gelatin layer-containing film is rolled upon itself, as occurs in roll film such as the composite film rolls described in U.S. Pat. 2,579,587, issued Dec. 25, 1961.

A somewhat different problem may arise in film packs such as those described in U.S. Pat. 3,002,437, referred to above, when the image-receiving layers are separated by carrier sheets to which there are attached tabs for the purpose of drawing said layers into predetermined positions in the camera in which they are being used. If film packs having such an arrangement are aged or exposed to elevated temperatures, patterns corresponding to the shape of such interposed elements sometimes are observed on the receiving layer after it has been developed. Similar problems may arise in roll film, where patterns in the image may result from perforations and deckling in the carrier layer which is in superposed relationship with the image-receiving layer in the film roll prior to exposure. These patterns are believed to result, at least in part, from the pressure of one element against the other, e.g., pressure of the tab against the surface of the image-receiving layer.

Still another problem sometimes arises when the receiving layer is stripped from the photosensitive layer, i.e., a portion of the developing reagent layer may stick to the receiving layer instead of the photosensitive layer, thereby resulting in undesirable esthetic defects, if not actual damage, to the finished print. Again, while this reagent sticking problem is most pronounced in the composite film pack elements described above, it is also manifested to some extent in all photographic films where images are produced by the spreading of a viscous processing reagent between a photoexposed surface and a receiving layer to produce an image by diffusion transfer, and the subsequent stripping off of the receiving layer containing final print. Further, this sticking phenomenon would appear to be a function, at least in part, of changes which take place in the receiving layer over extended periods of time, since it usually poses little problem for new film, but becomes considerably more pronounced in film which has been aged to any considerable degree, or which has been stored at or exposed to high temperatures for shorter times.

The above-discussed problems are particularly pronounced in such products designed for performing the color diffusion transfer process of U.S. Pat. No. 2,983,606, issued May 9, 1961 to Howard G. Rogers.

It is an object of the present invention, therefore, to provide photographic film assemblages which include at least one gelatin-containing layer and are particularly adapted to alleviate blocking of same after storage.

It is a further object of the present invention to provide photographic film assemblages which include at least one photosensitive layer and at least one receiving layer, and are particularly adapted to alleviate the adhesion of processing fluid to the receiving layer after the stripping thereof from the photosensitive layer.

Other objects of the invention will in part be obvious and will in part appear hereinafter.

The invention accordingly comprises the products possessing the features, properties, and the relation of elements which are exemplified in the following detailed disclosure, and the scope of the application of which will be indicated in the claim.

For a fuller understanding of the nature and objects of the invention, reference should be had to the following detailed description taken in connection with the accompanying drawing wherein:

FIG. 1 is a side view of a film unit embodying the invention, having a portion of the enclosing foil envelope cut away; and FIG. 2 is a plan view of the film unit shown in FIG. 1, also having a portion of the enclosing foil envelope cut away.

It has now been discovered that notwithstanding the usual hermetic packaging under controlled conditions of temperature and relative humidity, the blocking, pressure-marking and processing reagent sticking problems of photographic film discussed above are both apparently related, at least in part, to the relative humidity within the hermetically sealed package. Moreover, it has been found that these problems can be alleviated by the incorporation of a desiccant within the hermetically sealed package containing the photographic film element or elements.

Specifically, where packaging of photographic elements in hermetically sealed packages is carried out at about 72° F. and at 45% relative humidity, it has been found that the addition of sufficient solid desiccant to absorb about 25% of the moisture remaining in the package after the sealing thereof substantially inhibits blocking and sticking of the photographic elements over prolonged periods of time.

The solid desiccant could be simply added in a loose state to the film packages. For convenience of packaging, however, it is desirable to enclose the desiccant in a water vapor-permeable container, which container can then be placed inside the film package prior to sealing. For example, a pre-packaged desiccant which is suitable for the instant process is packaged silica gel, commercially available from the Davison Chemical Company, Baltimore, Md., under trade name "Dri-Pax."

Reference is now made to FIGS. 1 and 2 of the drawing where there is illustrated a film unit embodying the invention. The film unit comprises a housing 3 which contains photosensitive film assemblies having attached leader strips 4 for withdrawing said film assemblies from housing 3. The housing is enclosed within a hermetically sealed foil package 6, portions of which are broken away in FIGS. 1 and 2. Packets 5 containing desiccant are positioned on housing 3, within said hermetically sealed package.

It will be recognized that FIGS. 1 and 2 are presented as being representational of only one of many possibilities which may employ the instant invention. The particular adaptation of the invention can obviously vary widely, depending upon the nature and structure of the photo-sensitive film assemblies and the desiccant. In any case, the determination of the particular overall assembly of any given film unit embodying the invention is wholly within the skill of the practitioner.

While in many cases, for convenience of handling, silica gel is the desiccant of choice, it will readily be recognized that any other solid desiccant, e.g., anhydrous calcium sulfate, calcium chloride, etc., which does not readily give up the absorbed moisture under the conditions of use, would be satisfactory for purposes of practicing the instant invention.

The precise quantities of desiccant to be added to hermetically sealed film packages are not critical. Obviously, the desired quantity would vary with the nature of the desiccant, the nature and size of the film elements being packaged, and the quantity of paper within the foil package, the general rule being that there should be enough desiccant to absorb about 25% of the moisture remaining in the package after sealing. It has been found, for example, that the incorporation of about 16 grams of silica gel within hermetically sealed packages containing ten 4 x 5 film packets of Polaroid color film, Type 58, effectively precluded both blocking and reagent sticking, even when the packages were stored under accelerated aging conditions, i.e., for three days at 120° F. It has been found that about 5 grams of silica gel is similarly effective for a package containing a six-exposure film roll such as Polaroid color film, Type 48, and about 6 to 8 grams is effective for eight-exposure film packs such as Polaroid color film, Type 108. In like manner, it has been found that the incorporation of about 3 grams of silica gel in hermetically sealed-in packages containing eight-exposure film packs such as Polaroid black-and-white Land film pack, Type 107, effectively precluded the formation of pressure marks in the developed image, even when the packages were stored for five days at 120° F. prior to exposure and development. Packaged film units containing the silica gel have also been found to have an appreciably longer shelf life.

The reasons for the unexpected success of incorporating a desiccant into film packages, especially the effect thereof on the reagent sticking problem, are not entirely understood. Apparently, the problem is not simply a function of water coming in contact with the surface of the receiving layer, since when the aqueous processing reagent is spread on fresh receiving layers there is little tendency for the reagent to adhere. Rather, it would appear that over extended periods of time, certain adverse changes take place in the receiving layer which are accelerated by environmental moisture, and that such changes are inhibited by decreasing the relative humidity within the package.

In addition, it has been found that certain otherwise useful reagents, e.g., hardening agents useful in providing desired properties to an image-receiving layer, may have adverse effects if allowed to contact the photosensitive layer prior to exposure, e.g., the reagent or impurities therein may have a desensitizing effect upon silver halide. Contamination of this type is particularly likely to occur where the photosensitive layer and image-receiving layer are stored in face-to-face relationship, as in the above-described Type 58 4 x 5 film packets. The incorporation of the desiccant has been found to substantially reduce the incidence of such contamination, possibly by absorbing volatile organic materials which otherwise would diffuse to the image-receiving layer.

Since certain changes may be made in the above products without departing from the scope of the invention herein involved, it is intended that all matter contained in the above description and shown in the accompanying drawing shall be interpreted as illustrative and not in a limiting sense.

What is claimed is:

1. A photographic product comprising a package which has been hermetically sealed at about 45% relative humidity, said package containing at least one composite film unit comprising a multicolor photosensitive silver halide element containing yellow, magenta and cyan dye developers, an image-receiving layer, and means releasably containing and adapted to release, upon application of pressure to said film unit, a processing fluid adapted to develop said photosensitive silver halide element after photoexposure and to provide a multicolor transfer image on said image-receiving layer; said package further containing a sufficient quantity of silica gel to absorb about 25% of the moisture remaining in said package after hermetic sealing.

References Cited

UNITED STATES PATENTS 3,002,437  10/1961  Eloranta _____ 95—22

OTHER REFERENCES

Ansco Abstracts, vol. 14, p. 14, January 1954.
British Journal of Photography, p. 11, Jan. 3, 1964.

J. TRAVIS BROWN, Primary Examiner

U.S. Cl. X.R.

96—3, 29, 76